United States Patent
Gao et al.

(10) Patent No.: US 11,289,968 B2
(45) Date of Patent: Mar. 29, 2022

(54) MOTOR SEALING STRUCTURE AND MOTOR

(71) Applicant: GREE GREEN REFRIGERATION TECHNOLOGY CENTER CO., LTD. OF ZHUHAI, Zhuhai (CN)

(72) Inventors: Feng Gao, Zhuhai (CN); Jianning Liu, Zhuhai (CN); Yi Zheng, Zhuhai (CN)

(73) Assignee: GREE GREEN REFRIGERATION TECHNOLOGY CENTER CO., LTD. OF ZHUHAI, Zhubai (CN)

( * ) Notice: Subject to any disclaimer, the term of this patent is extended or adjusted under 35 U.S.C. 154(b) by 71 days.

(21) Appl. No.: 16/755,103

(22) PCT Filed: Oct. 29, 2018

(86) PCT No.: PCT/CN2018/112309
§ 371 (c)(1),
(2) Date: Apr. 9, 2020

(87) PCT Pub. No.: WO2019/095981
PCT Pub. Date: May 23, 2019

(65) Prior Publication Data
US 2021/0135532 A1    May 6, 2021

(30) Foreign Application Priority Data
Nov. 17, 2017   (CN) .......................... 201711145356.4

(51) Int. Cl.
*H02K 5/124*   (2006.01)
*H02K 9/06*    (2006.01)
(Continued)

(52) U.S. Cl.
CPC .............. *H02K 5/10* (2013.01); *H02K 5/124* (2013.01); *H02K 5/1735* (2013.01); *H02K 9/06* (2013.01)

(58) Field of Classification Search
CPC .......... H02K 9/06; H02K 7/003; H02K 5/124; H02K 5/10; F01D 5/025; F04D 29/20
(Continued)

(56) References Cited

U.S. PATENT DOCUMENTS

| 3,303,366 | A | * | 2/1967 | Elson | ..................... B23D 45/16 310/83 |
| 5,871,335 | A | * | 2/1999 | Bartlett | ................. F04D 29/329 416/244 R |

(Continued)

FOREIGN PATENT DOCUMENTS

| CN | 201971522 U | 9/2011 |
| CN | 201975907 U | 9/2011 |

(Continued)

OTHER PUBLICATIONS

International Search Report of PCT/CN2018/112309.
Written Opinion of PCT/CN2018/112309.

*Primary Examiner* — Quyen P Leung
*Assistant Examiner* — Alexander Moraza
(74) *Attorney, Agent, or Firm* — Dragon Sun Law Firm, PC; Jinggao Li, Esq.

(57) ABSTRACT

Provided are a motor sealing structure and a motor. The motor sealing structure comprises: a rotary shaft, a bearing, which is sleeved on the rotating shaft. A shaft shoulder structure is arranged on an outer peripheral wall of the rotating shaft at a position corresponding to the bearing along an axial direction of the rotating shaft, so as to form a cavity between a portion of the bearing and the shaft shoulder structure, and a fan blade structure, which is sleeved at one end of the rotating shaft and extends in the axial direction of the rotating shaft to the position of the bearing, and is inserted into and held in the cavity.

16 Claims, 7 Drawing Sheets

(51) Int. Cl.
*H02K 5/10* (2006.01)
*H02K 5/173* (2006.01)

(58) Field of Classification Search
USPC .................................. 310/62, 63, 85, 87, 88
See application file for complete search history.

(56) References Cited

U.S. PATENT DOCUMENTS

| | | | | |
|---|---|---|---|---|
| 6,224,340 | B1* | 5/2001 | Lessig, III | F04D 29/263 |
| | | | | 411/188 |
| 2004/0056539 | A1* | 3/2004 | Du | H02K 3/345 |
| | | | | 310/45 |
| 2005/0036898 | A1* | 2/2005 | Sweetland | F01D 5/048 |
| | | | | 419/6 |
| 2006/0261686 | A1* | 11/2006 | Rutsyamuka | H02K 5/10 |
| | | | | 310/53 |
| 2016/0265386 | A1* | 9/2016 | Annati | F01D 25/005 |
| 2017/0288499 | A1* | 10/2017 | Beyerl | H02K 29/08 |

FOREIGN PATENT DOCUMENTS

| | | |
|---|---|---|
| CN | 203722378 U | 7/2014 |
| CN | 204357952 U | 5/2015 |
| CN | 107888010 A | 4/2018 |
| CN | 207573148 U | 7/2018 |
| EP | 0423616 A1 | 4/1991 |

\* cited by examiner

MOTOR SEALING STRUCTURE AND MOTOR

CROSS-REFERENCE TO RELATED APPLICATIONS

This application is a national stage application of PCT Application No. PCT/CN2018/112309. This application claims priority from PCT Application No. PCT/CN2018/112309, filed Oct. 29, 2018, and CN Application No. 201711145356.4, filed Nov. 17, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure pertains to the technical field of motors, and particularly relates to a motor sealing structure and a motor.

BACKGROUND ART

The motor is almost applied in all industries of modern society, no matter in industry, agriculture, transportation or family life, the motor is indispensable. The application range of the motor is so wide that requirements of the protection grade of the motor are different, and as the motor realizes the conversion of electric quantity to mechanical energy, when the motor is in an open space, the protection capability of the motor itself is particularly important.

The motor is mainly comprised of a motor base (motor shell), a stator iron core, a rotor iron core, a rotating shaft, a bearing, an end cover and other parts, and the protection of the motor mainly refers to sealing effects between the motor base (motor shell) and the end cover, of the rotating shaft to the outside or between the rotating shaft and the bearing, and between the bearing and a bearing chamber of the end cover. The motor base (motor shell) and the end cover are relatively static, which can be realized by a pressure or internally arranging a sealing ring, adding a sealant and so on. For dynamic seal such as the rotating shaft, a felt, an oil seal, a labyrinth type structure or an extrusion type sealing ring and the like are generally adopted, while such sealing generally has several problems as follows:

1. The rotating shaft is in direct contact with a sealing element, which will cause energy loss, and affect the performance of the motor in serious cases, then the efficiency is reduced;

2. The labyrinth type sealing structure is complex, and limited in use, only suitable for certain rotating speeds;

3. Sealing in the bearing chamber of the end cover requires cooperation of an outer ring of the bearing with an extrusion type sealing ring, then the bearing will be subjected to a shearing force of inner and outer rings, which increases the pressure of balls and a support of the bearing, easily causes noises, and affects the service life of the bearing; and 4. Parts such as oil seals and sealing rings are added, increasing the costs.

As the prior art motor has the technical problems, for example, the rotating shaft is in direct contact with the sealing element, thus causing energy loss, and affecting the performance of the motor in serious cases, then the efficiency is reduced; the sealing structure is complex, and limited in use, only suitable for certain rotating speeds; noises are easily produced, and the service life of the bearing is reduced; and parts are added, increasing the costs, a motor sealing structure and a motor are researched and designed in the present disclosure.

Therefore, a heretofore unaddressed need exists in the art to address the aforementioned deficiencies and inadequacies.

SUMMARY OF THE INVENTION

Therefore, the technical problem to be solved in the present disclosure is to provide a motor sealing structure and a motor so as to overcome the defects of energy loss, influence on the performance of the motor in serious cases, and reduced efficiency of the prior art motor sealing structure.

The present disclosure provides a motor sealing structure, which includes:

a rotating shaft;

a bearing, which is sleeved on the rotating shaft, wherein a shaft shoulder structure is further provided on an outer peripheral wall of the rotating shaft at a position corresponding to the bearing along an axial direction of the rotating shaft, so as to form a cavity between a portion of the bearing and the shaft shoulder structure; and a fan blade structure, which is sleeved at one end of the rotating shaft and extends in the axial direction of the rotating shaft to the position of the bearing, and is inserted into the cavity.

Preferably, a portion of the fan blade structure inserted and held between the bearing and the rotating shaft has a length of 1.5 mm-5.0 mm in the axial direction.

Preferably, the fan blade structure includes a fan blade boss and blades, and the fan blade boss includes a fan blade boss hole; the fan blade boss is sleeved at one end of the rotating shaft through the fan blade boss hole, and the fan blade boss can be driven by the rotating shaft to rotate.

Preferably, an outer periphery of the rotating shaft is provided with a first flat position structure, and an inner wall of the fan blade boss hole is provided with a second flat position structure capable of matching the first flat position structure of the rotating shaft.

Preferably, the inner wall of the fan blade boss hole is further provided with a shoulder surface extending along the axial direction, and an outer peripheral surface of the rotating shaft is provided with a shoulder at a position corresponding to the shoulder surface, and the shoulder surface and the shoulder can be matched and contact each other so as to complete axial positioning between the rotating shaft and the fan blade boss.

Preferably, a step is further provided on an outer peripheral surface of an end portion of the fan blade boss, and the step can be inserted into the cavity, to complete axial position limiting with the bearing.

Preferably, the fan blade structure further comprises a wheel disc, and the wheel disc is connected to and provided at a radial outer side of the fan blade boss; a plurality of the blades are provided on the wheel disc, and arranged along a circumferential direction thereof.

Preferably, a reinforcing rib is further provided on the wheel disc, and one end of the reinforcing rib is fixedly connected with the outer peripheral surface of the fan blade boss.

Preferably, there are a plurality of the reinforcing ribs, and the number of the reinforcing ribs is corresponding to the number of the blades, and the plurality of reinforcing ribs are arranged along a circumferential direction of the wheel disc.

Preferably, an end cover is further included, and the end cover includes a first portion and a second portion connected in the axial direction; the first portion is sleeved on a radial outer side of the bearing, the second portion is located at a radial outer side of the rotating shaft, and the fan blade boss of the fan blade structure is inserted into a position between the radial inner side of the second portion of the end cover and the radial outer side of the rotating shaft.

Preferably, when the fan blade boss hole is included, an inner wall of the fan blade boss hole and an outer peripheral wall of the rotating shaft are in interference fit therebetween;

and/or, when the fan blade boss is included, the bearing includes an inner ring of the bearing and an outer ring of the bearing, and the fan blade boss and the inner ring of the bearing are in interference fit therebetween;

and/or, the bearing includes the inner ring of the bearing and the outer ring of the bearing, and the outer ring of the bearing and the first portion of the end cover are in interference fit therebetween;

and/or, the bearing includes the inner ring of the bearing and the outer ring of the bearing, and the inner ring of the bearing and the rotating shaft are in transition fit or clearance fit therebetween;

and/or, the bearing is a waterproof bearing;

and/or, the material of the fan blade structure is a plastic material.

The present disclosure further provides a motor, including a rotor, and a stator, and it further includes the motor sealing structure in the preceding.

The motor sealing structure and the motor provided in the present disclosure have following beneficial effects:

For the motor sealing structure and the motor in the present disclosure, by means of the fan blade structure, which is sleeved at one end of the rotating shaft and extends in the axial direction of the rotating shaft to the position of the bearing, and is inserted and held between the radial inner side of the bearing and the radial outer side of the rotating shaft, sealing can be realized by the cooling blades of the motor, such that the fan blade structure is in contact with the inner ring of the bearing, and rotates synchronously with the inner ring of the bearing, without adding the sealing element, preventing direct contact of the rotating shaft with the sealing element, causing no energy loss, solving the problem of energy loss of the presently commonly used sealing modes, ensuring the performance of the motor, improving the efficiency, and having a simple structure, being conveniently assembled, just by means of normal press mounting; adding no other parts, and saving the costs.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

In the drawings, reference numerals indicate:

1. rotating shaft; 11. shoulder; 2. bearing; 3. fan blade structure; 31. fan blade boss; 310. fan blade boss hole; 311. second flat position structure; 312. shoulder surface; 313. step; 314. retaining ring for shaft; 32. blade; 33. wheel disc; 4. cavity; 5. reinforcing rib; 6. end cover; 61. front end cover; 62. rear end cover; 7. motor base; 8. junction box; 9. support foot; 10. fan cover; 101. rotor iron core; 102. stator iron core.

DETAILED DESCRIPTION OF THE EMBODIMENTS

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Referring to what is shown in FIGS. 1-8, the present disclosure provides a motor sealing structure, which includes:

a rotating shaft 1;

a bearing 2, which is sleeved on the rotating shaft 1, wherein a shaft shoulder structure is further provided on an outer peripheral wall of the rotating shaft 1 at a position corresponding to the bearing 2 along an axial direction of the rotating shaft, so as to form a cavity 4 between a portion of the bearing 2 and the shaft shoulder structure; and a fan blade structure 3, which is sleeved at one end of the rotating shaft 1 and extends in the axial direction of the rotating shaft 1 to the position of the bearing 2, and is inserted into and held in the cavity 4, that is, inserted into and held in a position radially inside the bearing 2 and radially outside the rotating shaft 1.

Figure 2:
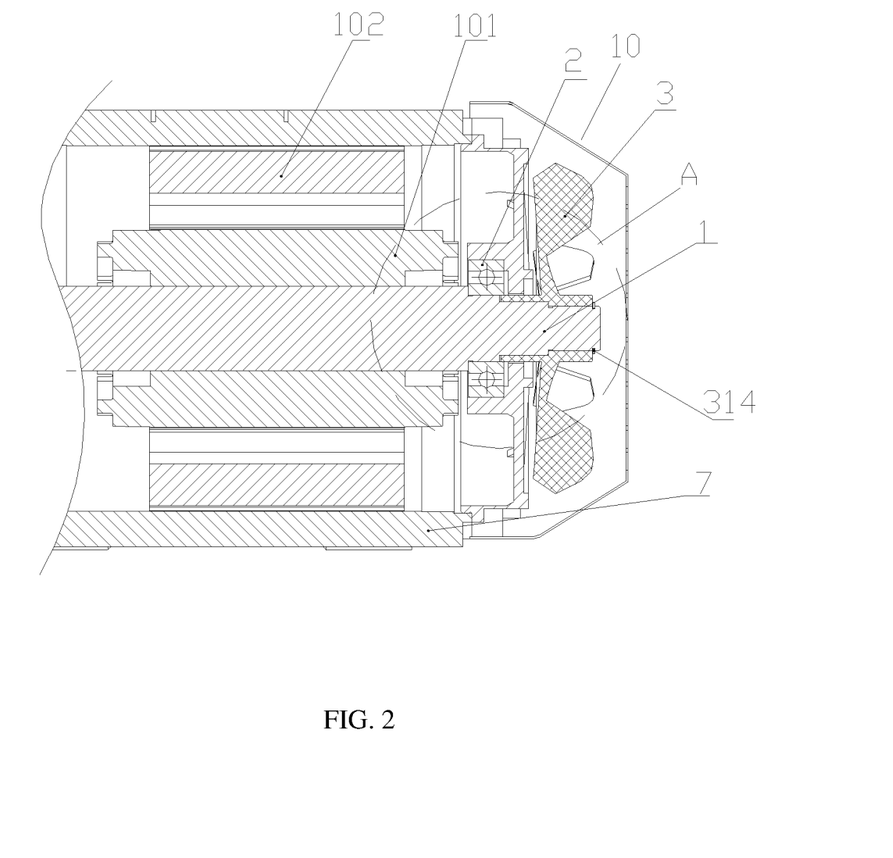
FIG. 2 is a sectional view of a motor sealing structure of the present disclosure.
Figure 3:
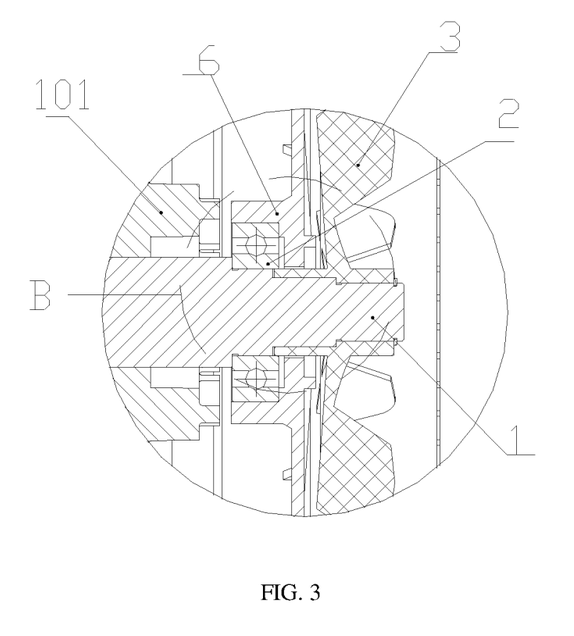
FIG. 3 is a partial enlarged view of part A in FIG. 2.
Figure 4:
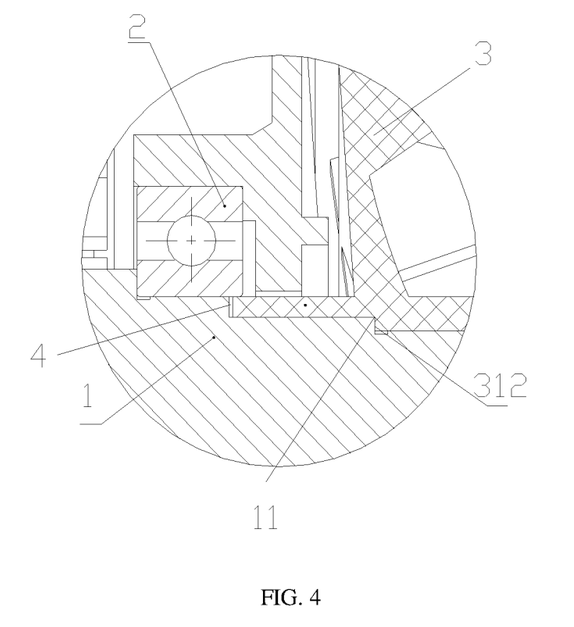
FIG. 4 is a partial enlarged view of part B in FIG. 3.
Figure 5A:
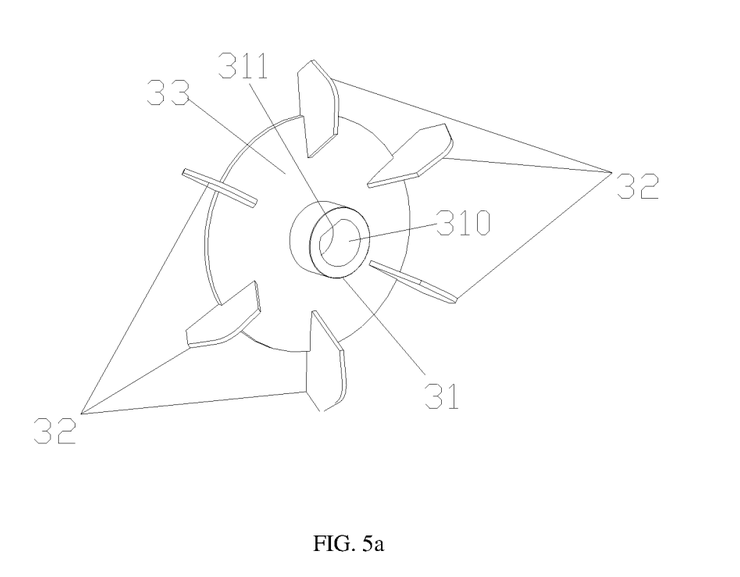
FIG. 5a is a front three-dimensional structural view of embodiment 1 of a fan blade structure in the present disclosure.
Figure 5B:
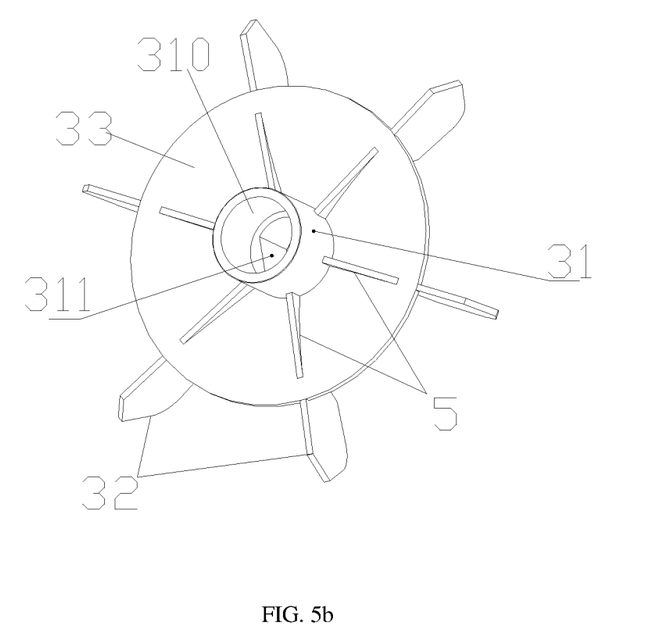
FIG. 5b is a rear three-dimensional structural view of embodiment 1 of the fan blade structure in the present disclosure.
Figure 5C:
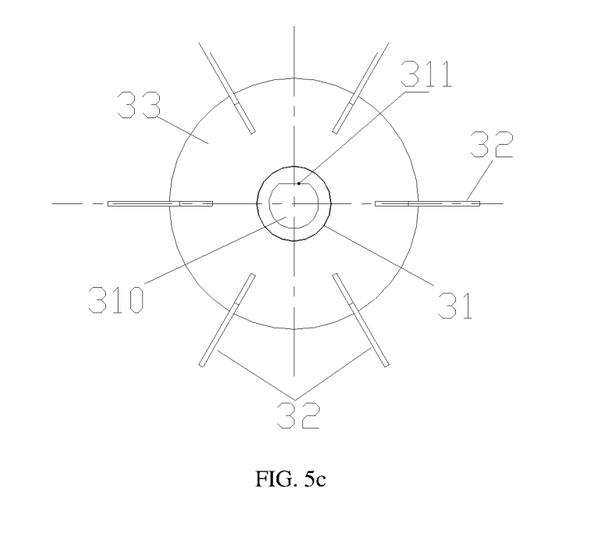
FIG. 5c is a front structural view of embodiment 1 of the fan blade structure in the present disclosure.
Figure 5D:
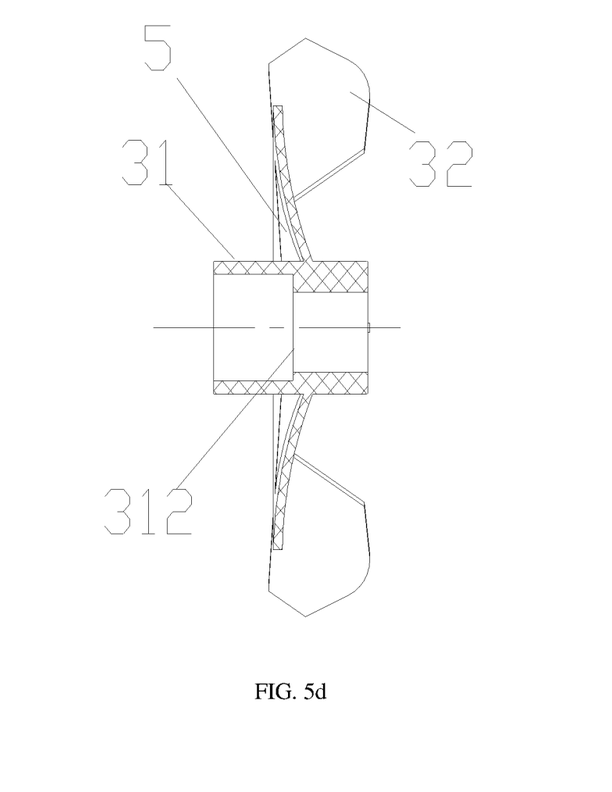
FIG. 5d is a side sectional structural view of embodiment 1 of the fan blade structure in the present disclosure.
Figure 6:
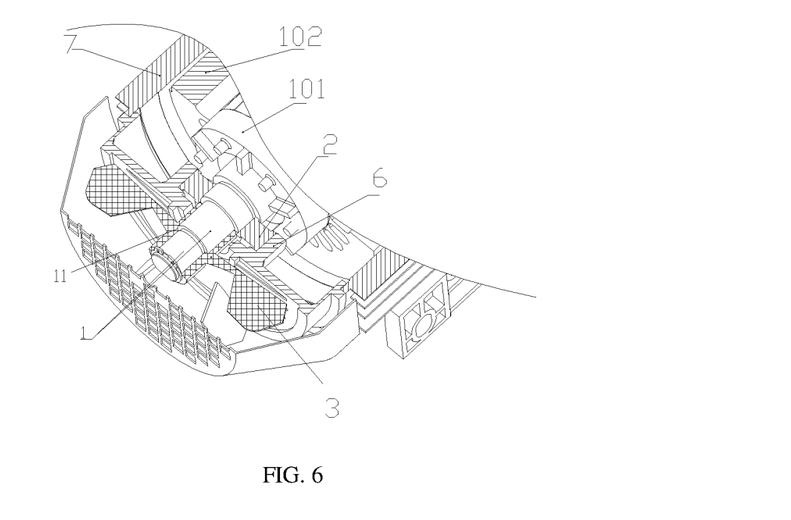
FIG. 6 is an assembled structural view of embodiment 1 of the fan blade structure in the present disclosure.

In the present disclosure, a cooling fan of a motor is utilized, a fan boss is lengthened and extended into an inner ring of the bearing for a certain distance, preventing external water or dust from entering, that is, by means of the fan blade structure, which is sleeved at one end of the rotating shaft and extends in the axial direction of the rotating shaft to the position of the bearing, and is inserted and held between the radial inner side of the bearing and the radial outer side of the rotating shaft (that is, inserted into and held in the cavity formed between the shaft shoulder structure provided on the rotating shaft and the bearing, wherein as shown in FIGS. 2-4, this shaft shoulder structure extends to a position near a left section of a rightmost end of the bearing, but does not extend to a leftmost end of the bearing, such that a left end of the bearing can cooperate with the rotating shaft to complete a supporting function, and this cavity is configured for insertion of the fan blade structure for sealing), the bearing and the rotating shaft can be sealed therebetween by means of the cooling blades that the motor originally had, such that the fan blade structure is in contact with the inner ring of the bearing, and rotates synchronously with the inner ring of the bearing, without adding the sealing element, preventing direct contact of the rotating shaft with the sealing element, causing no energy loss, solving the problem of energy loss of the presently commonly used sealing modes, ensuring the performance of the motor, improving the efficiency, and having a simple structure, being conveniently assembled, just by means of normal press mounting; adding no other parts, and saving the costs.

For the fan blade structure sealing mode used in the present disclosure, the fan blade boss (i.e. fan blade boss 31) is used, which is extended into the inner ring of the bearing for a certain distance, an outer ring of the boss is in transition or small interference fit with the inner ring of the bearing, the outer ring of the bearing is in interference fit with a bearing chamber of the end cover, and the bearing is a waterproof bearing. This sealing mode not only can ensure the protection level of the motor, and synchronous rotation of the fan blade structure with the inner ring of the bearing, but also will not cause energy loss, with a simple structure, convenient assembling, no damage to other parts, and no need of adding new parts.

Figure 1:
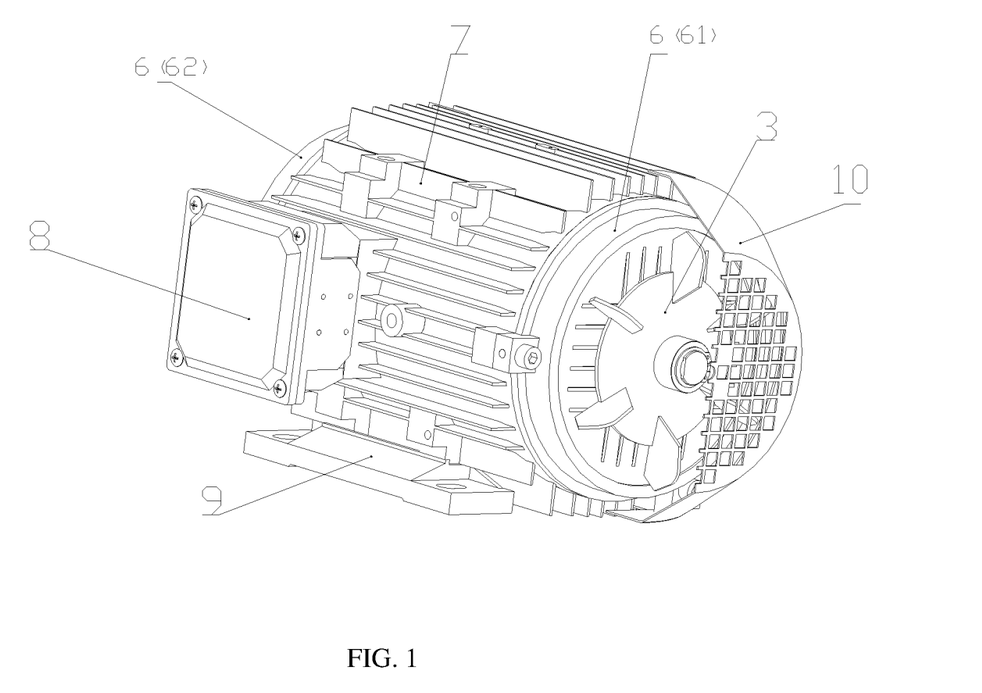
FIG. 1 is a three-dimensional structural schematic diagram of outline of a motor of the present disclosure.

FIG. 1 shows outline of a typical three-phase asynchronous motor. During running, the motor will have various reactive losses, and these losses will be converted to heat energy. The fan blade structure at the end of the motor rotates synchronously with the rotor, and wind generated flows through a fan cover along cooling fins on a motor base to take away heat dissipated from the inside of the motor, so as to achieve the effect of cooling the motor.

Preferably,
a portion of the fan blade structure 3 inserted and held between the bearing 2 and the rotating shaft 1 has a length of 1.5 mm-5.0 mm (in the present disclosure, preferably for a 608 bearing, a value of this length is preferably 1.5 mm) in the axial direction. An effective contact area between the rotating shaft and the inner ring of the bearing should be considered for the inserted length, which is appropriately adjusted specifically according to the size of the bearing. In the present disclosure, this distance (length) is set to be about 1.5 mm, which can effectively ensure transmission of a torque, such that the bearing and the rotating shaft are effectively sealed therebetween.

Preferably,
the fan blade structure 3 includes a fan blade boss 31 and blades 32, and the fan blade boss 31 includes a fan blade boss hole 310. The fan blade boss 31 is sleeved at one end of the rotating shaft 1 through the fan blade boss hole 310, and the blades 32 can rotate with rotation of the fan blade boss 31. This is a specific structure form of the fan blade structure in the sealing structure of the present disclosure, and the fan blade structure can be fixed by sleeving the fan blade boss on the rotating shaft, and the blades rotate with rotation of the fan blade boss, such that internal structures (including the rotor, a stator, and so on) of the motor can be cooled through rotation of the blades.

FIG. 2 and FIG. 3 show a fan blade sealing structure, and FIG. 2 mainly shows the internal structures of the motor, including stator and rotor iron cores, the rotating shaft 1, the end cover 6, the bearing 2 and so on. The rotating shaft 1 is in contact with the inner ring of the bearing through the shaft shoulder, achieving axial position limiting.

FIG. 4 shows details of the fan blade sealing structure. The boss (fan blade boss 31) of the fan blade structure 3 is directly extended to be in contact with the inner ring of the bearing for a certain distance, and the outer ring of the boss and the inner ring of the bearing are designed to be in transition or small interference fit, such that external water or dust cannot enter from the inner ring of the bearing, and the outer ring of the bearing and an inner ring of the bearing chamber of the end cover 6 are in interference fit, then water or dust cannot pass therethrough. In order to facilitate assembling, the outer ring of the rotating shaft of the motor and the inner ring of the bearing are designed to be in small clearance or transition fit, and a waterproof bearing is selected as the bearing.

Preferably, an outer periphery of the rotating shaft 1 is provided with a first flat position structure, and an inner wall of the fan blade boss hole 310 is provided with a second flat position structure 311 capable of matching the first flat position structure of the rotating shaft 1, such that the fan blade boss 31 can be driven by the rotating shaft 1 to rotate. With the first flat position structure on the rotating shaft and the second flat position structure on the fan blade boss hole, the fan blade boss is allowed to be capable of cooperating with the rotating shaft through the two flat position structures, and circumferential directions of the fan blade boss and the rotating shaft are limited by the two flat position structures, such that when the rotating shaft rotates, the fan blade boss is driven to rotate synchronously with the rotating shaft, and the inner ring of the bearing also rotates synchronously with the rotating shaft, thereby realizing good sealing between the rotating shaft and the bearing through the fan blade boss, and generating a quantity of wind through the rotation to cool the interior of the motor.

Referring to what is shown in FIGS. 2-4, preferably,
an inner wall of the fan blade boss hole 310 is further provided with a shoulder surface 312 extending along the axial direction, and an outer peripheral surface of the rotating shaft 1 is provided with a shoulder 11 at a position corresponding to the shoulder surface, and the shoulder surface 312 and the shoulder 11 can be matched and contact each other so as to complete axial positioning between the rotating shaft 1 and the fan blade boss 31. By providing the shoulder and the shoulder surface, the fan blade boss hole and the rotating shaft can be matched and positioned in the axial direction, ensuring the fan blade boss to be assembled in place (to a suitable position) during assembling along the axial direction.

Figure 7A:
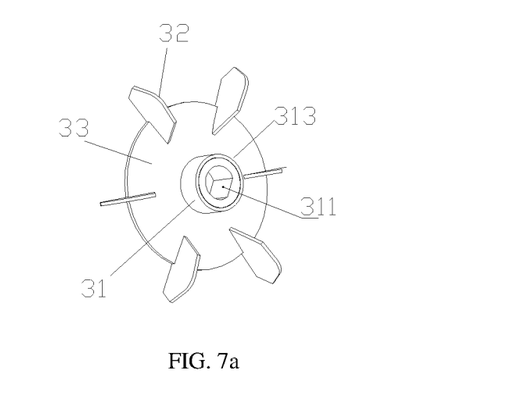
FIG. 7a is a front three-dimensional structural view of embodiment 2 of the fan blade structure in the present disclosure.
Figure 7B:
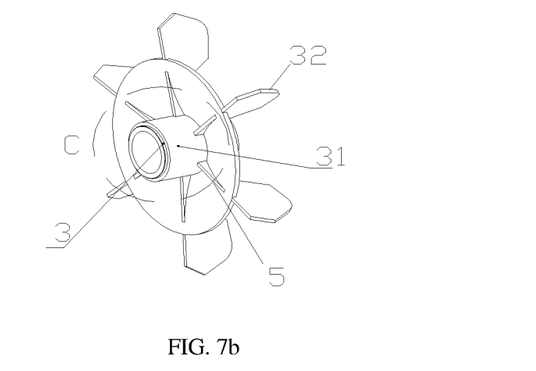
FIG. 7b is a rear three-dimensional structural view of embodiment 2 of the fan blade structure in the present disclosure.
Figure 7C:
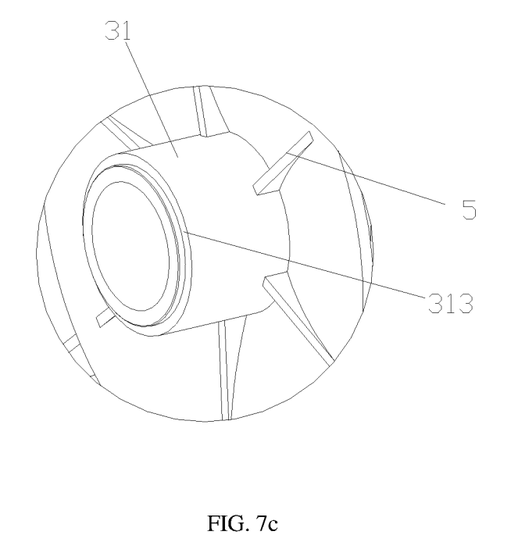
FIG. 7c is a partial enlarged structural view of part C in FIG. 7b.
Figure 8:
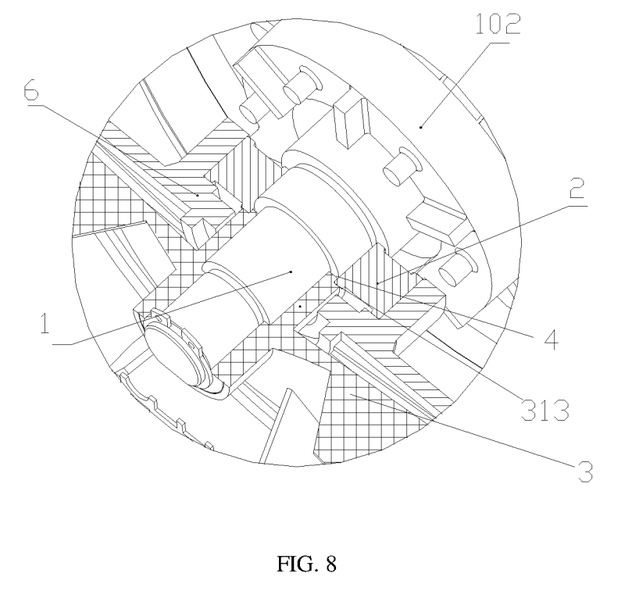
FIG. 8 is an assembled structural view of embodiment 2 of the fan blade structure in the present disclosure.

Referring to what is shown in FIG. 7a-FIG. 8, preferably,
a step 313 is further provided on an outer peripheral surface of an end portion of the fan blade boss 31, and the step 313 can be inserted into the cavity 4, to complete axial position limiting with the bearing 2. By providing the step on the outer peripheral surface of the end portion of the fan blade boss, the step and the cavity can cooperate in an insertion manner, further enhancing the sealing performance between the bearing and the rotating shaft, and further serving a positioning function in the axial and radial directions, such that after assembling, the fan blade structure is not easy to fall off, and the sealing performance is improved.

FIGS. 5a-5d and FIGS. 7a-7c show two fan blade structures, wherein FIGS. 7a-7c are derived by adding a step structure 313 at the end portion of the fan blade boss 31, which can serve a position limiting function during the fan blade structure is pressed in. The inner rings of two types of fan blade structure are each provided with a flat position structure, which cooperates with the flat position of the rotating shaft, to limit the circumferential direction of the fan blade structure to restrict the relative rotation of the fan blade structure and the rotating shaft.

Preferably, the fan blade structure 3 further includes a wheel disc 33, the wheel disc 33 is connected to and provided at a radial outer side of the fan blade boss 31, a plurality of the blades 32 are provided on the wheel disc 33, and arranged along a circumferential direction thereof. By providing the above wheel disc structure, the blades of the fan blade structure can be supported, the structural strength of the fan blade structure is enhanced, and the blades thereon are driven to rotate through rotation, so as to achieve the function and effect of generating wind through rotation.

Preferably, a reinforcing rib 5 is further provided on the wheel disc 33, and one end of the reinforcing rib 5 is fixedly connected with the outer peripheral surface of the fan blade boss 31. By providing the reinforcing rib, the structural strength of the fan blade structure can be further enhanced, ensuring stability of the fan blade structure during rotation.

Preferably, there are a plurality of the reinforcing ribs 5, and the number of the reinforcing ribs is corresponding to the number of the blades, and the plurality of reinforcing ribs are arranged along a circumferential direction of the wheel disc 33. The plurality of reinforcing ribs can function to support the wheel disc in the circumferential direction, and improve the structural strength of the overall support of the fan blade structure in the circumferential direction.

Preferably, an end cover 6 is further included, the end cover 6 includes a first portion and a second portion connected in the axial direction. The first portion is sleeved on a radial outer side of the bearing 2, the second portion is located at a radial outer side of the rotating shaft 1 (see what is shown in FIGS. 2-4, that is, the first portion is the bearing chamber located at the left side in the figure, so as to allow the bearing to enter to play a role of supporting the bearing, and the second portion is an end plate located at the right side in the figure), and the fan blade boss 31 of the fan blade structure 3 is inserted into a position between the radial inner side of the second portion of the end cover 6 and the radial outer side of the rotating shaft 1.

As the end cover is a structure of the motor itself, by providing the above structures, the fan blade boss in the fan blade structure also can cooperate with the end cover, that is, the fan blade boss is inserted between the radial inner side of the end cover and the radial outer side of the rotating shaft, and is further extended between the radial inner side of the bearing and the radial outer side of the rotating shaft, being capable of also forming a sealing effect between the end cover and the rotating shaft, improving the sealing effect between the end cover and the rotating shaft, further improving the sealing effect between the bearing and the rotating shaft, and further ensuring no energy loss or minimal loss.

Preferably, when the fan blade boss hole 310 is included, an inner wall of the fan blade boss hole 310 and an outer peripheral wall of the rotating shaft 1 are in interference fit therebetween;

and/or, when the fan blade boss 31 is included, the bearing 2 includes the inner ring of the bearing and the outer ring of the bearing, and the fan blade boss 31 and the inner ring of the bearing are in interference fit therebetween;

and/or, the bearing 2 includes the inner ring of the bearing and the outer ring of the bearing, and the outer ring of the bearing and the first portion of the end cover are in interference fit therebetween;

and/or, the bearing 2 includes the inner ring of the bearing and the outer ring of the bearing, and the inner ring of the bearing and the rotating shaft are in transition fit or clearance fit therebetween;

and/or, the bearing 2 is a waterproof bearing;

and/or, the material of the fan blade structure 3 is a plastic material.

The outer ring of the bearing is designed to be in interference fit with an inner diameter of the bearing chamber of the end cover, and an outer diameter of the rotating shaft and the inner ring of the bearing are designed to be in transition or small clearance fit, facilitating the assembly. The boss (fan blade boss 31) of the fan blade structure 3 outside the end cover is extended into the inner ring of the bearing for a certain distance through a shaft hole in the middle of the end cover 6. An outer diameter of the fan blade boss and the inner ring of the bearing are designed to be in small interference or transition fit. An effective contact area between the rotating shaft and the inner ring of the bearing should be considered for the extended length, ensuring effective transmission of the torque. The inserted length is generally about 1.5 mm, and can be appropriately adjusted specifically according to the size of the bearing. The inner diameter of the fan blade boss and the outer diameter of the rotating shaft are also designed to be in small interference or transition fit, and a waterproof bearing is selected as the bearing. As in the assembled views of FIG. 6 and FIG. 8, as the outer ring of the bearing and the inner ring of the bearing chamber of the end cover are in interference fit without clearance, external water or dust cannot enter through the outer ring of the bearing, and the inner ring of the bearing is in interference fit with the fan blade boss without clearance, the inner ring of the boss is also in interference fit with the outer ring of the rotating shaft without clearance, then water or dust cannot enter therefrom. The waterproof bearing is selected as the bearing, then no water or dust can enter through a bearing cover, thus playing a protecting role.

The present disclosure further provides a motor, including a rotor and a stator, and it further includes the motor sealing structure mentioned in the preceding. In the present disclosure, with the motor sealing structure mentioned in the preceding, a cooling fan of the motor is utilized, a fan boss is lengthened and extended into an inner ring of the bearing for a certain distance, preventing external water or dust from entering, that is, by means of a fan blade structure, which is sleeved at one end of the rotating shaft and extends in the axial direction of the rotating shaft to the position of the bearing, and is inserted and held between the radial inner side of the bearing and the radial outer side of the rotating shaft, the bearing and the rotating shaft can be sealed therebetween by means of the cooling blades that the motor originally had, such that the fan blade structure is in contact with the inner ring of the bearing, and rotates synchronously with the inner ring of the bearing, without adding the sealing element, preventing direct contact of the rotating shaft with the sealing element, causing no energy loss, solving the problem of energy loss of the presently commonly used sealing modes, ensuring the performance of the motor, improving the efficiency, and having a simple structure, being conveniently assembled, just by means of normal press mounting; adding no other parts, and saving the costs.

A specific assembling process is as follows: first pressing the bearing into the bearing chamber of the end cover, wherein during the pressing, the bearing is pressed into place by a fixture contacting the outer ring of bearing, then inserting the rotating shaft (rotor) into the inner ring of the bearing, limiting the position of the inner ring of the bearing by the shaft shoulder on the rotating shaft, and finally, pressing the fan blade structure in, wherein during the pressing, the inner ring of the bearing is subjected to a force through the rotating shaft, preventing the inner and outer rings of the bearing from being subjected to a shearing force. For the fan blade structure shown in FIGS. 7a-7c, the step on the fan blade structure can be used for position limiting, and if there is no step structure, as in the case of the fan blade structure in FIGS. 5a-5d, the fixture can be used for position limiting. As the material of the fan blade structure is plastic, after the fan blade structure is squeezed, the bearing clearance will not be reduced when both the inner and outer rings of the bearing are squeezed, therefore, running noises of the motor will not be affected.

Therefore, with the present disclosure, the protection grade of the motor can be ensured, moreover, as the shoulder of the fan blade structure is in direct contact and cooperation with the inner ring of the bearing, rotates synchronously with the inner ring of the bearing and the rotating shaft, no friction will be caused, and there is no energy loss. Besides, the flat position structure is on an inner ring of the fan blade structure, and cooperates with the flat position of the rotating shaft, then no relative circumferential rotation will occur, an end face of the fan blade structure is limited by a retaining ring for shaft, further improving the reliability of the fan blade structure.

The fan blade is a part for cooling of the motor, which is already equipped on the motor, particularly as a standard configuration in a three-phase asynchronous motor, therefore, there is no need to add additional parts, and the cost is saved.

The problem of mounting and position limiting of the fan blade structure in FIGS. 5a-5d is described as follows:

in FIGS. 5a-5d, as the fan blade structure has no step, and are of a straight-tube type, when the fan blade structure is pressed in, a position limiting structure should be added to a pressure fixture, which can be realized in two following methods:

Method 1:

The motor is arranged in the fixture, the rotating shaft of the motor props against a top pressure block on the fixture, and a push plate on the fixture can slide in parallel through a sliding groove of a bottom plate. When the fan blade structure is pressed, a pressure head on the push plate props against end face of the fan blade structure, an external thrust acts on the push plate to push the push plate (pressure head), such that the fan blade structure is gradually sleeved on the shaft. A limiting column is mounted on a support plate, the limiting column has such a length that the fan blade structure, when mounted in place, just abuts against the push plate (the specific length is calculated by calculating the interrelationships such as the length of the motor, the thickness of a fixture plate, the position of the fan blade structure relative to the rotating shaft after being mounted and so on before processing). Due to errors in assembling and processing, an effective length of the limiting column cannot be processed to the length just needed at one time, therefore, the limiting column can be threaded on the support plate, and a limiting length is fine-tuned by screwing in or screwing out screw threads. Therefore, the push plate (pressure head) pushes the fan blade structure to be sleeved on the rotating shaft under the action of external thrust, and when the push plate contacts the limiting column, the fan blade structure is installed in place.

Method 2:

A fixture rack is the same as the above, while the difference lies in that the limiting column is cancelled, the top pressure block on the support plate is used for position limiting. The depth of a sinking platform on the top pressure block is designed to be the same as the extended length of the shaft after the fan blade structure is installed in place, that is, a push plate (pressure head) is pushed by an external thrust to enable the fan blade structure to be gradually sleeved on the shaft, when the shaft at the side of the fan blades extends out of the end face of the fan blade structure and abuts against a surface of the sinking platform of the top pressure block, the fan blade structure is installed in place. The distinction lies in that the limiting column is used in method 1 for position limiting, while in method 2, whether the assembling is in place is unavailable through visual inspection, then the external thrust is set to be a constant force, and under this thrust, when the push plate cannot move, a shaft end at the side of the fan blades has abut against the surface of the sinking platform of the top pressure block, indicating that the assembling is in place.

Besides, a boss surface on the inner wall of the fan blade structure also can be used for position limiting, and when the boss surface (i.e. shoulder surface 312) inside the fan blade structure abuts against the shaft shoulder (i.e. rotating shaft shoulder 11), it indicates that the assembling is in place. but it is inadvisable to simultaneously use the limiting function of this structure with the case where the fan blade structure has an outer boss structure (fan blade structure in FIGS. 7a-7c), as it will cause over-positioning.

The above-mentioned are merely for preferable embodiments of the present disclosure, rather than limiting the present disclosure. Any modification, equivalent replacements, improvements and so on made within the spirit and principle of the present disclosure should be covered within the scope of protection of the present disclosure. The above-mentioned are merely for preferred embodiments of the present disclosure, and it should be indicated that a person ordinarily skilled in the art, without departing from the technical principle of the present disclosure, still could make several improvements and alterations, and these improvements and alterations also should be considered as within the scope of protection of the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A motor sealing structure, comprising:
   a rotating shaft;
   a bearing, which is sleeved on the rotating shaft, wherein a shaft shoulder structure is further provided on an outer peripheral wall of the rotating shaft at a position corresponding to the bearing along an axial direction of the rotating shaft, so as to form a cavity between a portion of the bearing and the shaft shoulder structure;
   a fan blade structure, which is sleeved at one end of the rotating shaft and extends in the axial direction of the rotating shaft to the position of the bearing, and is inserted into the cavity;
   wherein the fan blade structure comprises a fan blade boss and blades, and the fan blade boss comprises a fan blade boss hole; the fan blade boss is sleeved at one end of the rotating shaft through the fan blade boss hole, and the fan blade boss is capable of being driven by the rotating shaft to rotate; and
   a step is further provided on an outer peripheral surface of an end portion of the fan blade boss, and the step is capable of being inserted into the cavity, to complete axial position limiting with the bearing.

2. The sealing structure according to claim 1, wherein a portion of the fan blade structure inserted and held between the bearing and the rotating shaft has a length of 1.5 mm-5.0 mm in the axial direction.

3. The sealing structure according to claim 2, wherein an outer periphery of the rotating shaft is provided with a first flat position structure, and an inner wall of the fan blade boss hole is provided with a second flat position structure capable of matching the first flat position structure of the rotating shaft.

4. The sealing structure according to claim 3, wherein the inner wall of the fan blade boss hole is further provided with a shoulder surface extending along the axial direction, and an outer peripheral surface of the rotating shaft is provided with a shoulder at a position corresponding to the shoulder surface, and the shoulder surface and the shoulder are capable of being matched and contact each other so as to complete axial positioning between the rotating shaft and the fan blade boss.

5. The sealing structure according to claim 2, wherein the fan blade structure further comprises a wheel disc, and the wheel disc is connected to and provided at a radial outer side of the fan blade boss; a plurality of the blades are provided on the wheel disc, and arranged along a circumferential direction thereof.

6. The sealing structure according to claim 5, wherein a reinforcing rib is further provided on the wheel disc, and one end of the reinforcing rib is fixedly connected with the outer peripheral surface of the fan blade boss.

7. The sealing structure according to claim 6, wherein there are a plurality of the reinforcing ribs, and the number of the reinforcing ribs is corresponding to the number of the blades, and the plurality of reinforcing ribs are arranged along a circumferential direction of the wheel disc.

8. The sealing structure according to claim 2, further comprising an end cover, wherein the end cover comprises a first portion and a second portion connected in the axial direction; the first portion is sleeved on a radial outer side of the bearing, the second portion is located at a radial outer side of the rotating shaft, and the fan blade boss of the fan blade structure is inserted into a position between the radial inner side of the second portion of the end cover and the radial outer side of the rotating shaft.

9. The sealing structure according to claim 1, wherein an outer periphery of the rotating shaft is provided with a first flat position structure, and an inner wall of the fan blade boss hole is provided with a second flat position structure capable of matching the first flat position structure of the rotating shaft.

10. The sealing structure according to claim 9, wherein the inner wall of the fan blade boss hole is further provided with a shoulder surface extending along the axial direction, and an outer peripheral surface of the rotating shaft is provided with a shoulder at a position corresponding to the shoulder surface, and the shoulder surface and the shoulder are capable of being matched and contact each other so as to complete axial positioning between the rotating shaft and the fan blade boss.

11. The sealing structure according to claim 1, wherein the fan blade structure further comprises a wheel disc, and the wheel disc is connected to and provided at a radial outer side of the fan blade boss; a plurality of the blades are provided on the wheel disc, and arranged along a circumferential direction thereof.

12. The sealing structure according to claim 11, wherein a reinforcing rib is further provided on the wheel disc, and one end of the reinforcing rib is fixedly connected with the outer peripheral surface of the fan blade boss.

13. The sealing structure according to claim 12, wherein there are a plurality of the reinforcing ribs, and the number of the reinforcing ribs is corresponding to the number of the blades, and the plurality of reinforcing ribs are arranged along a circumferential direction of the wheel disc.

14. The sealing structure according to claim 1, further comprising an end cover, wherein the end cover comprises a first portion and a second portion connected in the axial direction; the first portion is sleeved on a radial outer side of the bearing, the second portion is located at a radial outer side of the rotating shaft, and the fan blade boss of the fan blade structure is inserted into a position between the radial inner side of the second portion of the end cover and the radial outer side of the rotating shaft.

15. The sealing structure according to claim 14, wherein an inner wall of the fan blade boss hole and the outer peripheral wall of the rotating shaft are in interference fit therebetween;
   and/or, the bearing comprises an inner ring of the bearing and an outer ring of the bearing, and the fan blade boss and the inner ring of the bearing are in interference fit therebetween;
   and/or, the bearing comprises the inner ring of the bearing and the outer ring of the bearing, and the outer ring of the bearing and the first portion of the end cover are in interference fit therebetween;
   and/or, the bearing comprises the inner ring of the bearing and the outer ring of the bearing, and the inner ring of the bearing and the rotating shaft are in transition fit or clearance fit therebetween;
   and/or, the bearing is a waterproof bearing;
   and/or, the material of the fan blade structure is a plastic material.

16. A motor, comprising a rotor, and a stator, and further comprising the motor sealing structure according to claim 1.

* * * * *